US012614535B2

(12) United States Patent
Jang

(10) Patent No.: US 12,614,535 B2
(45) Date of Patent: Apr. 28, 2026

(54) DISPLAY DEVICE HAVING ADJUSTABLE TRANSMITTANCE AND OPERATIONAL METHOD THEREFOR

(71) Applicant: LG ELECTRONICS INC., Seoul (KR)

(72) Inventor: Eunkwang Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/873,244

(22) PCT Filed: Jun. 8, 2022

(86) PCT No.: PCT/KR2022/008094
§ 371 (c)(1),
(2) Date: Dec. 9, 2024

(87) PCT Pub. No.: WO2023/238966
PCT Pub. Date: Dec. 14, 2023

(65) Prior Publication Data

US 2025/0356821 A1 Nov. 20, 2025

(51) Int. Cl.
*G09G 5/10* (2006.01)

(52) U.S. Cl.
CPC ....... *G09G 5/10* (2013.01); *G09G 2320/0626* (2013.01); *G09G 2354/00* (2013.01); *G09G 2360/144* (2013.01)

(58) Field of Classification Search
CPC ............. G09G 5/10; G09G 2320/0626; G09G 2354/00; G09G 2360/144; G09G 3/20; G09G 3/38; G09G 3/006; G02F 1/166; G02F 1/1685
See application file for complete search history.

(56) References Cited

U.S. PATENT DOCUMENTS

2011/0261303 A1 10/2011 Jang et al.
2014/0184577 A1* 7/2014 Kim ........................ G02F 1/172 345/207
2016/0154269 A1* 6/2016 Fukuoka .................. G09G 3/34 345/87

FOREIGN PATENT DOCUMENTS

KR 10-2014-0088028 A 7/2014
KR 10-2015-0028128 A 3/2015
KR 10-2017-0072119 A 6/2017
KR 10-2021-0060250 A 5/2021

* cited by examiner

*Primary Examiner* — Rodney Amadiz
(74) *Attorney, Agent, or Firm* — Birch, Stewart, Kolasch & Birch, LLP

(57) ABSTRACT

A transparent display device and an operational method therefor are disclosed. The transparent display device comprises: a memory; at least one sensor unit; and a control unit for adjusting the transmittance of a panel transmission module with respect to incident light on the basis of the average picture level (APL) value of and input image and the illuminance of the incident light calculated through the at least one sensor unit.

16 Claims, 9 Drawing Sheets

FIG. 7

LUT for Transmittance Adjustment

Dark
Low Transmittance

| No. | Outside Brightness | Image APL | Transmittance |
| --- | --- | --- | --- |
| 1 | Range 1 | 0 ~ 25 | Step1 |
| 2 | Range 2 | 26 ~ 50 | Step2 |
| 3 | Range 3 | 51 ~ 75 | Step3 |
| 4 | Range 4 | 76 ~ 100 | Step4 |
| 5 | Range 5 | 101 ~ 125 | Step5 |
| 6 | Range 6 | 126 ~ 150 | Step6 |
| 7 | Range 7 | 151 ~ 175 | Step7 |
| 8 | Range 8 | 176 ~ 200 | Step8 |
| 9 | Range 9 | 201 ~ 225 | Step9 |
| 10 | Range 10 | 226 ~ 255 | Step10 |

Bright
High Transmittance (a)

```
Transmittance Step 10;
IF APL >= Outside Brightness
IF Outside Brightness <=Range2,
{
IF APL - Outside Brightness >=4
Maintain Transmittance ;
ELSE
Transmittance Step1;
}
ELSE
{
IF APL - Outside Brightness >=5
Maintain Transmittance ;
ELSE
Maintain Transmittance Step2;
}
ELSE
Transmittance Step1;
```

(b)

FIG. 8

Dark
Low Transmittance

Bright
High Transmittance

LUT for Transmittance Adjustment

| No. | Outside Brightness | Image APL | Panel brightness | Transmittance |
|---|---|---|---|---|
| 1 | Range 1 | 0 ~ 25 | 0 ~ 10 | Step1 |
| 2 | Range 2 | 26 ~ 50 | 11 ~20 | Step2 |
| 3 | Range 3 | 51 ~ 75 | 21 ~ 30 | Step3 |
| 4 | Range 4 | 76 ~ 100 | 31 ~40 | Step4 |
| 5 | Range 5 | 101 ~ 125 | 41 ~ 50 | Step5 |
| 6 | Range 6 | 126 ~ 150 | 51 ~ 60 | Step6 |
| 7 | Range 7 | 151 ~ 175 | 61 ~70 | Step7 |
| 8 | Range 8 | 176 ~ 200 | 71 ~ 80 | Step8 |
| 9 | Range 9 | 201 ~ 225 | 81 ~ 90 | Step9 |
| 10 | Range 10 | 226 ~ 255 | 91 ~100 | Step10 |

(a)

```
Transmittance Step 10;
IF APL >= Outside Brightness
IF outside brightness <=Range2 & brightness control algorithm operates (TPC/PLC)
{
Brightness reduction by 2 levels according to brightness control algorithm;
IF APL – Outside Brightness >=4
Current transmittance -2;
ELSE
Transmittance Step1;
}
ELSE IF External Brightness >=Range3 & Brightness Control Algorithm Operation (TPC/PLC)
{
IF APL – Outside Brightness >=5 ,
Current transmittance -2 (Outside brightness -2) ;
ELSE
Transmittance Step1;
}
ELSE
Transmittance Step1;
```

(b)

DISPLAY DEVICE HAVING ADJUSTABLE TRANSMITTANCE AND OPERATIONAL METHOD THEREFOR

CROSS REFERENCE TO RELATED APPLICATION

This application is the National Phase of PCT International Application No. PCT/KR2022/008094, filed on Jun. 8, 2022, which is hereby expressly incorporated by reference into the present application.

TECHNICAL FIELD

The present disclosure relates to a transparent display, and more specifically, to a transparent display device and operational method therefor that improve a visibility of an input image by considering light incident from an outside.

RELATED ART

Digital TV services using wired or wireless communication networks are becoming widespread. Digital TV services can provide various services that were not available in existing analog broadcasting services.

For example, Internet Protocol Television (IPTV) and smart TV services, which are types of digital TV services, provide interactivity that allows users to actively select the type of program to be viewed, viewing time, etc. Based on this interactivity, IPTV and smart TV services can provide various additional services, such as Internet search, home shopping, and online games.

For this reason, there is a demand for display devices with relatively large display sizes compared to mobile terminals, and display devices that were previously installed only in limited spaces are now being installed and used in various places for various purposes.

As such, display devices are placed in various environments depending on the installation location, and accordingly, problems with the visibility of the output images occur. For example, in the case of conventional transparent display devices, they operate only in on/off mode, i.e., in a complete light-blocking mode or a complete light-blocking mode, just like a switch, and thus, they do not respond appropriately to light irradiated from the outside, resulting in very low visibility of the input image.

Therefore, a method for improving the visibility of images in a display device is required even in such an environment.

DETAILED DESCRIPTION OF THE INVENTION

Technical Problem

The present disclosure provides a transparent display device and an operating method thereof that improve the visibility of an input image by controlling the transmittance of an external incident light.

The present disclosure provides a transparent display device and an operating method thereof that adjusts the electrical light-blocking level of a panel transmission module in stages to control the transmittance of the external incident light.

Technical Solution

A transparent display device according to an embodiment of the present disclosure may include a memory; at least one sensor; and a controller configured to adjust a transmittance of a panel transmission module for an incident light based on an illuminance of the incident light calculated through the at least one sensor and an average picture level (APL) value of an input image.

A method of operating a transparent display device according to an embodiment of the present disclosure may include determining whether it is a transparent mode; deactivating a control operation set in a light-blocking mode when it is the transparent mode; calculating an illuminance of an incident light and an average picture level (APL) value of an input image; and controlling a transmittance of a panel transmission module for the incident light based on at least two or more of the calculated illuminance of the incident light, the average picture level (APL) value of the input image, and the luminance value of a panel, depending on whether the brightness control algorithm is in operation.

Effect of the Invention

According to at least one of the various embodiments of the present disclosure, there is an effect of improving the visibility of an input image despite an external incident light.

According to at least one of the various embodiments of the present disclosure, there is an effect of further improving the visibility of the input image by setting the optimal transmittance of the panel corresponding to the input image in consideration of the external incident light, the brightness setting value of the panel, the average picture level of the input image, etc.

BRIEF DESCRIPTION OF THE DRAWINGS

FIG. 7 is a diagram illustrating a method for controlling the transmittance of a panel in a display device according to an embodiment of the present invention.

FIG. 8 is a diagram illustrating a method for controlling the transmittance of a second display device according to an embodiment of the present invention.

BEST MODE

Hereinafter, embodiments related to the present invention will be described in more detail with reference to the drawings. The suffixes "module" and "part" used for components in the following description are given or used interchangeably only for the convenience of writing the specification, and do not have distinct meanings or roles in themselves.

The display device according to the embodiment of the present invention is, for example, an intelligent display device that adds a computer-assisted function to the broadcast reception function, and while remaining faithful to the broadcast reception function, it can have an interface that is more convenient to use, such as a manual input device, a touch screen, or a space remote control, by adding an Internet function, etc. In addition, it can perform functions such as email, web browsing, banking, or games by connecting to the Internet and a computer with the support of wired or wireless Internet functions. A standardized general-purpose OS can be used for these various functions.

Therefore, the display device described in the present invention can perform various user-friendly functions, for example, since various applications can be freely added or deleted on a general-purpose OS kernel. The above display device may be, more specifically, a network TV, HBBTV, smart TV, LED TV, OLED TV, etc., and may be applied to a smartphone in some cases.

Hereinafter, the display device according to the present invention will be described using a transparent display device as an example for convenience of explanation, but is not necessarily limited thereto.

Figure 1:
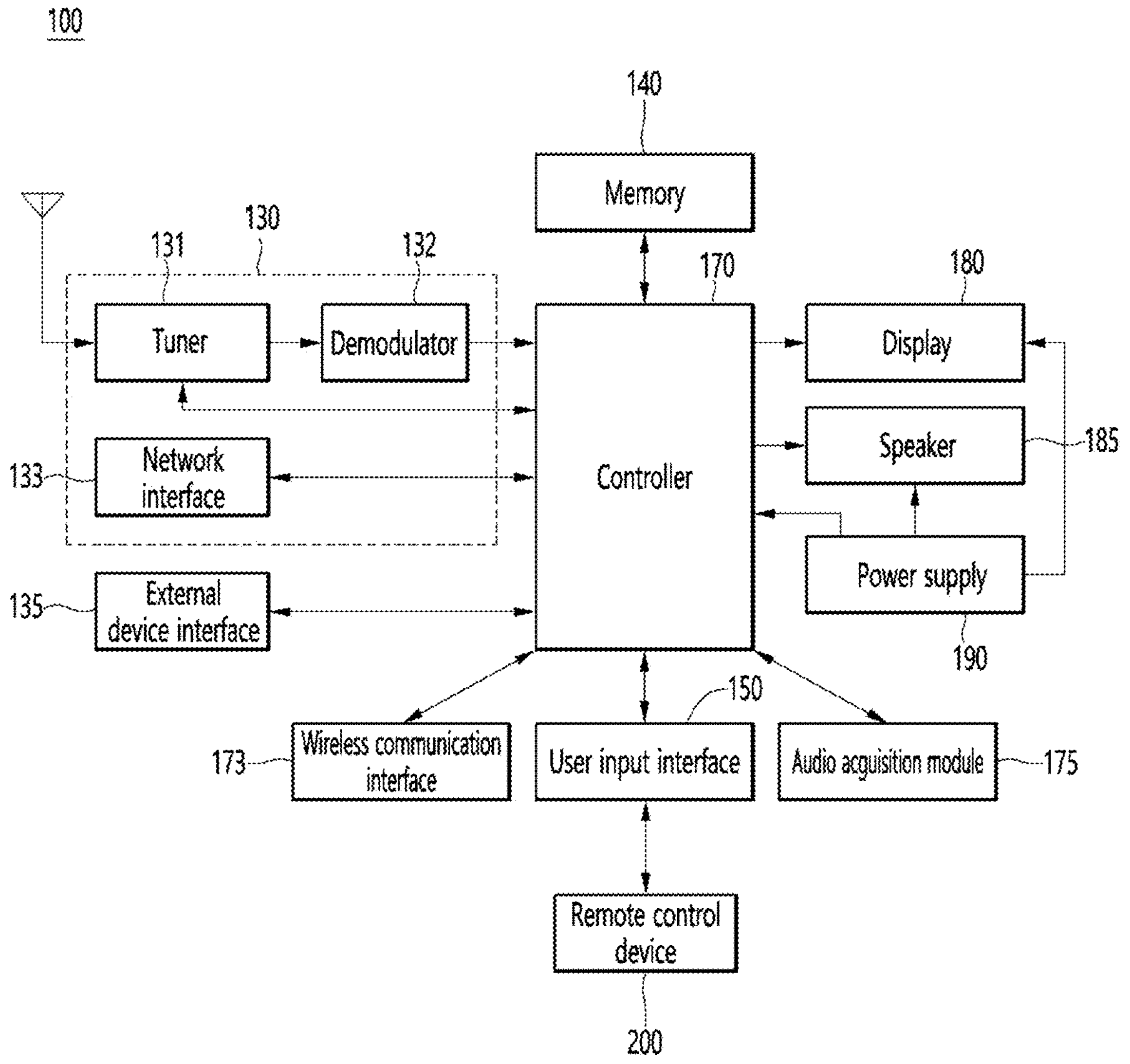
FIG. 1 is a block diagram illustrating the configuration of a display device according to an embodiment of the present invention.

FIG. 1 is a block diagram illustrating the configuration of a display device according to an embodiment of the present invention.

Referring to FIG. 1, the display device 100 may include a broadcasting receiver 130, an external device interface 135, a memory 140, a user input interface 150, a controller 170, a wireless communication interface 173, a display 180, a speaker 185, and a power supply 190.

The broadcasting receiver 130 may include a tuner 131, a demodulator 132, and a network interface 133.

The tuner 131 can select a specific broadcast channel according to a channel selection command. The tuner 131 can receive a broadcast signal for the selected specific broadcast channel.

The demodulator 132 can separate the received broadcast signal into a video signal, an audio signal, and a data signal related to the broadcast program, and can restore the separated video signal, audio signal, and data signal into a form that can be output.

The external device interface 135 can receive an application or an application list in an adjacent external device and transmit it to the controller 170 or memory 140.

The external device interface 135 can provide a connection path between the display device 100 and the external device. The external device interface 135 can receive one or more of images and audio output from an external device connected wirelessly or wiredly to the display device 100 and transmit it to the controller 170. The external device interface 135 can include a plurality of external input terminals. The plurality of external input terminals can include an RGB terminal, one or more High-Definition Multimedia Interface (HDMI) terminals, and a component terminal.

The image signal of the external device input through the external device interface 135 can be output through the display 180. The audio signal of the external device input through the external device interface 135 can be output through the speaker 185.

The external device that can be connected to the external device interface 135 may be one of a set-top box, a Blu-ray player, a DVD player, a game console, a sound bar, a smartphone, a PC, a USB memory, and a home theater, but this is only an example.

The network interface 133 may provide an interface for connecting the display device 100 to a wired/wireless network including the Internet. The network interface 133 may transmit or receive data with another user or another electronic device through the connected network or another network linked to the connected network.

In addition, some content data stored in the display device 100 may be transmitted to another user or another electronic device selected from among other users or other electronic devices pre-registered in the display device 100.

The network interface 133 may access a predetermined web page through the connected network or another network linked to the connected network. In other words, it may access a predetermined web page through the network and transmit or receive data with the corresponding server.

And, the network interface 133 can receive content or data provided by the content provider or network operator. That is, the network interface 133 can receive content such as movies, advertisements, games, VOD, broadcast signals, etc. and information related thereto provided from the content provider or network provider through the network.

In addition, the network interface 133 can receive update information and update files of firmware provided by the network operator, and can transmit data to the Internet or the content provider or network operator.

The network interface 133 can select and receive a desired application from among applications open to the public through the network.

The memory 140 can store programs for each signal processing and control within the controller 170, and can store signal-processed images, voices, or data signals.

In addition, the memory 140 may perform a function for temporary storage of video, audio, or data signals input from an external device interface 135 or a network interface 133, and may store information about a given image through a channel memory function.

The memory 140 may store an application or an application list input from an external device interface 135 or a network interface 133.

The display device 100 may play content files (video files, still image files, music files, document files, application files, etc.) stored in the memory 140 and provide them to the user.

The user input interface 150 may transmit a signal input by the user to the controller 170 or transmit a signal from the controller 170 to the user. For example, the user input interface 150 may receive and process control signals such as power on/off, channel selection, and screen settings from the remote control device 200 according to various communication methods such as Bluetooth™, Ultra Wideband (WB), ZigBee, Radio Frequency (RF) communication, or IR communication, or may process control signals from the controller 170 to be transmitted to the remote control device 200.

In addition, the user input interface 150 may transmit control signals input from local keys (not shown) such as power keys, channel keys, volume keys, and settings to the controller 170.

The image signal processed by the controller 170 may be input to the display 180 and displayed as an image corresponding to the image signal. In addition, the image signal processed by the controller 170 may be input to an external output device through the external device interface 135.

The voice signal processed in the controller 170 can be output as audio to the speaker 185. In addition, the voice signal processed in the controller 170 can be input to an external output device through the external device interface 135.

In addition, the controller 170 can control the overall operation within the display device 100.

In addition, the controller 170 can control the display device 100 by a user command or an internal program input through the user input interface 150, and can connect to a network to allow the user to download a desired application or application list into the display device 100.

The controller 170 enables the user-selected channel information, etc. to be output through the display 180 or speaker 185 together with the processed image or audio signal.

In addition, the controller 170 enables the image signal or audio signal from an external device, such as a camera or camcorder, input through the external device interface 135 to be output through the display 180 or speaker 185 according to the external device image playback command received through the user input interface 150.

Meanwhile, the controller 170 can control the display 180 to display an image, and for example, the controller can control the display 180 to display a broadcast image input through the tuner 131, an external input image input through the external device interface 135, an image input through the network interface, or an image stored in the memory 140. In this case, the image displayed on the display 180 may be a still image or a moving image, and may be a 2D image or a 3D image.

In addition, the controller 170 may control the content stored in the display device 100, or the received broadcast content, or the external input content input from the outside to be played, and the content may be in various forms such as a broadcast image, an external input image, an audio file, a still image, a connected web screen, and a document file.

The wireless communication interface 173 may perform communication with an external device through wired or wireless communication. The wireless communication interface 173 may perform short range communication with an external device. To this end, the wireless communication interface 173 may support short-range communication using at least one of Bluetooth, Radio Frequency Identification (RFID), Infrared Data Association (IrDA), UWB, ZigBee, Near Field Communication (NFC), Wireless-Fidelity (Wi-Fi), Wi-Fi Direct, and Wireless Universal Serial Bus (Wireless USB) technologies. The wireless communication interface 173 may support wireless communication between the display device 100 and a wireless communication system, between the display device 100 and another display device 100, or between the display device 100 and a network where the display device (100, or an external server) is located through short-range wireless communication networks (Wireless Area Networks). The short-range wireless communication networks may be short-range wireless personal area networks (Wireless Personal Area Networks).

Here, the other display device 100 may be a wearable device (e.g., a smart watch, smart glass, a head-mounted display (HMD)) or a mobile terminal such as a smart phone that can exchange data with the display device 100 according to the present invention (or can be linked). The wireless communication interface 173 may detect (or recognize) a wearable device capable of communication around the display device 100.

Furthermore, if the detected wearable device is a device authenticated to communicate with the display device 100 according to the present invention, the controller 170 may transmit at least a part of the data processed in the display device 100 to the wearable device through the wireless communication interface 173. Therefore, the user of the wearable device may use the data processed in the display device 100 through the wearable device.

The display 180 can convert the image signal, data signal, on screen display (OSD) signal processed by the controller 170 or the image signal, data signal, etc. received from the external device interface 135 into R, G, B signals, respectively, to generate a driving signal.

Meanwhile, the display device 100 illustrated in FIG. 1 is only an embodiment of the present invention. Some of the illustrated components may be integrated, added, or omitted according to the specifications of the display device 100 actually implemented.

That is, two or more components may be combined into one component, or one component may be subdivided into two or more components, as needed. In addition, the functions performed by each block are for explaining an embodiment of the present invention, and the specific operations or devices thereof do not limit the scope of the rights of the present invention.

According to another embodiment of the present invention, the display device 100 may receive and play back images through a network interface 133 or an external device interface 135 without having a tuner 131 and a demodulator 132 as shown in FIG. 1.

For example, the display device 100 may be implemented separately as an image processing device such as a set-top box (STB) for receiving broadcast signals or contents according to various network services, and a content playback device for playing back contents input from the image processing device.

In this case, the operation method of the display device according to the embodiment of the present invention to be described below may be performed by any one of the image processing device such as the separated set-top box or the content playback device having the display 180 and the audio output module 185, as well as the display device 100 described with reference to FIG. 1.

Next, with reference to FIGS. 2 and 3, a remote control device according to an embodiment of the present invention will be described.

Figure 2:
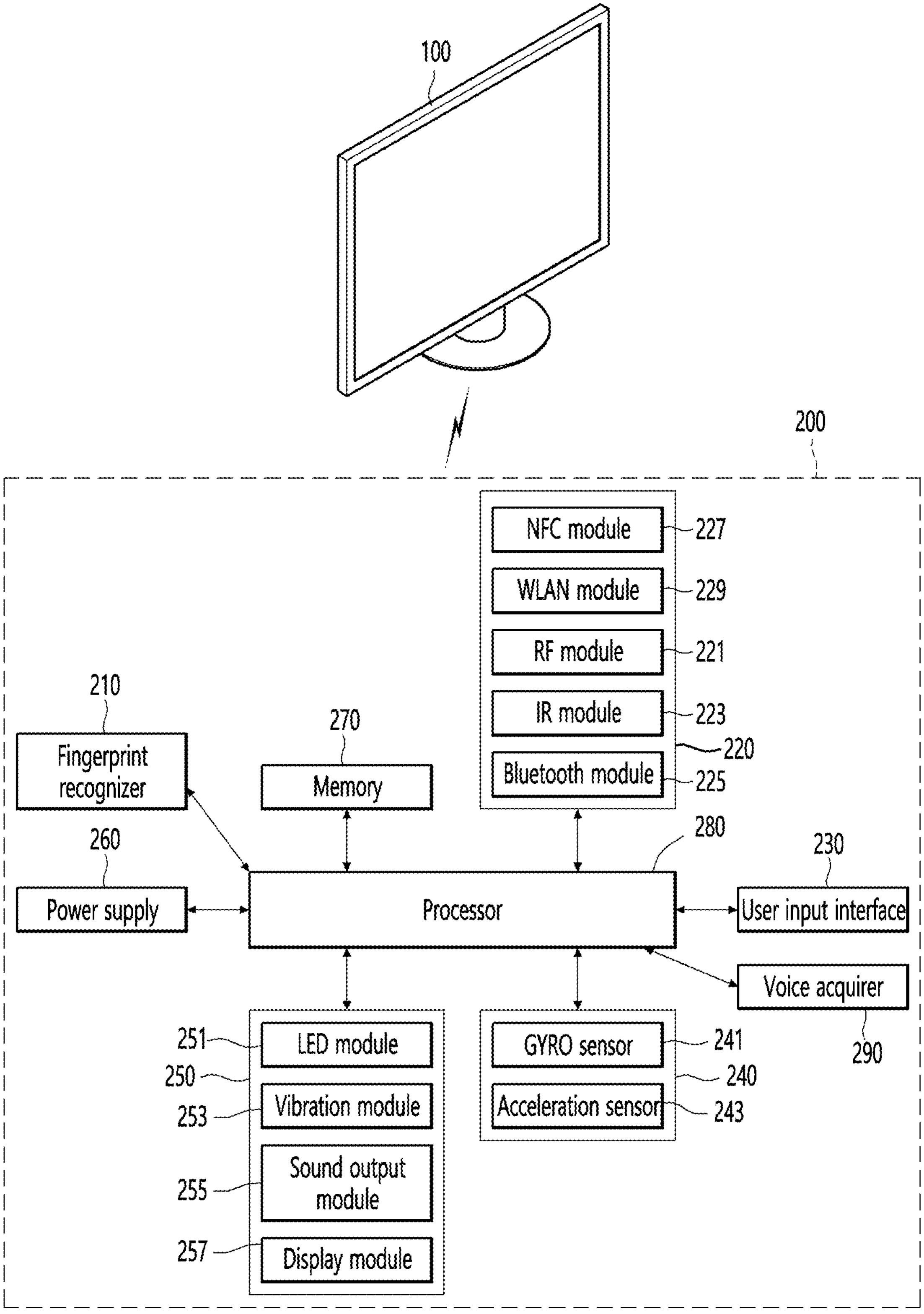
FIG. 2 is a block diagram of a remote control device according to an embodiment of the present invention.
Figure 3:
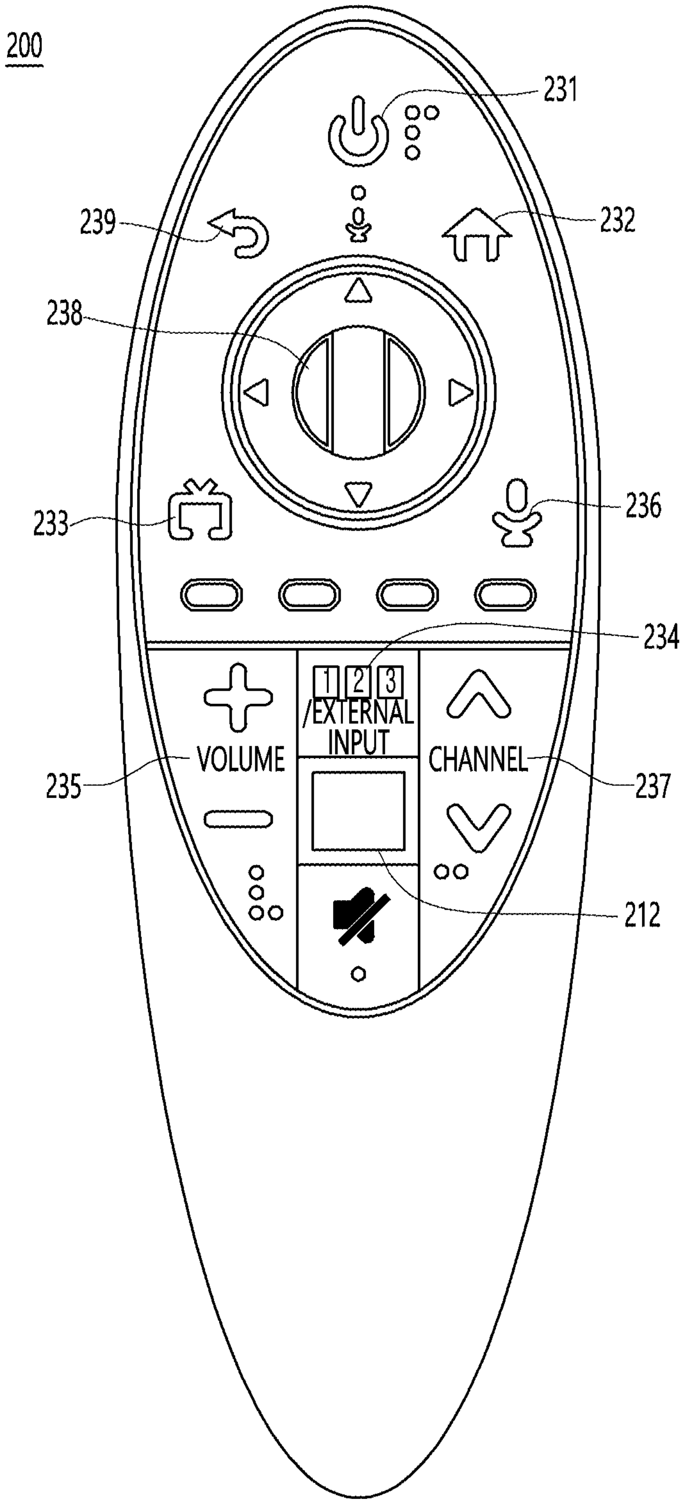
FIG. 3 illustrates an actual configuration example of a remote control device according to an embodiment of the present invention.

FIG. 2 is a block diagram of a remote control device according to an embodiment of the present invention, and FIG. 3 illustrates an example of an actual configuration of a remote control device according to an embodiment of the present invention.

First, with reference to FIG. 2, a remote control device 200 may include a fingerprint recognition device 210, a wireless communication circuit 220, a user input interface 230, a sensor 240, an output interface 250, a power supply circuit 260, a memory 270, a controller 280, and a microphone 290.

With reference to FIG. 2, the wireless communication circuit 220 transmits and receives signals with any one of the display devices according to the embodiments of the present invention described above.

The remote control device 200 may be equipped with an RF circuit 221 capable of transmitting and receiving signals with the display device 100 according to RF communication standards, and an IR circuit 223 capable of transmitting and receiving signals with the display device 100 according to IR communication standards. In addition, the remote control device 200 may be equipped with a Bluetooth circuit 225 capable of transmitting and receiving signals with the display device 100 according to Bluetooth communication standards. In addition, the remote control device 200 may be equipped with an NFC circuit 227 capable of transmitting and receiving signals with the display device 100 according to NFC (Near Field Communication) communication standards, and a WLAN circuit 229 capable of transmitting and receiving signals with the display device 100 according to WLAN (Wireless LAN) communication standards.

In addition, the remote control device 200 transmits a signal containing information about the movement of the remote control device 200 to the display device 100 through the wireless communication circuit 220.

Meanwhile, the remote control device 200 can receive a signal transmitted by the display device 100 through the RF circuit 221, and, if necessary, can transmit commands for power on/off, channel change, volume change, etc. to the display device 100 through the IR circuit 223.

The user input interface 230 may be composed of a keypad, a button, a touch pad, or a touch screen. The user may input a command related to the display device 100 to the remote control device 200 by operating the user input interface 230. If the user input interface 230 has a hard key button, the user may input a command related to the display device 100 to the remote control device 200 by pushing the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a confirmation button 238, and a back button 239.

The fingerprint recognition button 212 may be a button for recognizing a user's fingerprint. In one embodiment, the fingerprint recognition button 212 may be capable of a push operation, and may receive a push operation and a fingerprint recognition operation.

The power button 231 may be a button for turning the power of the display device 100 on/off.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the volume output by the display device 100.

The voice recognition button 236 may be a button for receiving the user's voice and recognizing the received voice.

The channel change button 237 may be a button for receiving a broadcast signal of a specific broadcast channel.

The confirmation button 238 may be a button for selecting a specific function, and the back button 239 may be a button for returning to the previous screen.

FIG. 2 will be described again.

If the user input interface 230 has a touch screen, the user can input a command related to the display device 100 using the remote control device 200 by touching the soft key of the touch screen. In addition, the user input interface 230 may be equipped with various types of input means that the user can operate, such as a scroll key or a jog key, and this embodiment does not limit the scope of the rights of the present invention.

The sensor 240 may be equipped with a gyro sensor 241 or an acceleration sensor 243, and the gyro sensor 241 may sense information about the movement of the remote control device 200.

For example, the gyro sensor 241 may sense information about the operation of the remote control device 200 based on the x, y, and z axes, and the acceleration sensor 243 may sense information about the movement speed of the remote control device 200. Meanwhile, the remote control device 200 may further be equipped with a distance measuring sensor, and may sense the distance to the display 180 of the display device 100.

The output interface 250 may output a video or audio signal corresponding to the operation of the user input interface 230 or corresponding to a signal transmitted from the display device 100.

The user can recognize whether the output interface 250 is operating the user input interface 230 or controlling the display device 100.

For example, the output interface 250 may be equipped with an LED 251 that lights up when the user input interface 230 is operated or a signal is transmitted and received with the display device 100 through the wireless communication module 225, a vibrator 253 that generates vibration, a speaker 255 that outputs sound, or a display 257 that outputs an image.

In addition, the power supply circuit 260 supplies power to the remote control device 200, and reduces power waste by stopping the power supply when the remote control device 200 does not move for a predetermined period of time.

The power supply circuit 260 may resume the power supply when a predetermined key equipped on the remote control device 200 is operated.

The memory 270 can store various types of programs, application data, etc. required for the control or operation of the remote control device 200.

When the remote control device 200 wirelessly transmits and receives signals through the display device 100 and the RF circuit 221, the remote control device 200 and the display device 100 transmit and receive signals through a predetermined frequency band.

The controller 280 of the remote control device 200 can store and refer to information about the frequency band, etc., that can wirelessly transmit and receive signals with the display device 100 paired with the remote control device 200 in the memory 270.

The controller 280 controls all matters related to the control of the remote control device 200. The controller 280 can transmit a signal corresponding to a predetermined key operation of the user input interface 230 or a signal corresponding to the movement of the remote control device 200 sensed by the sensor 240 to the display device 100 through the wireless communication module 225.

In addition, the microphone 290 of the remote control device 200 can obtain voice.

The microphone 290 can be provided in multiple units.

Next, FIG. 4 will be described.

Figure 4:
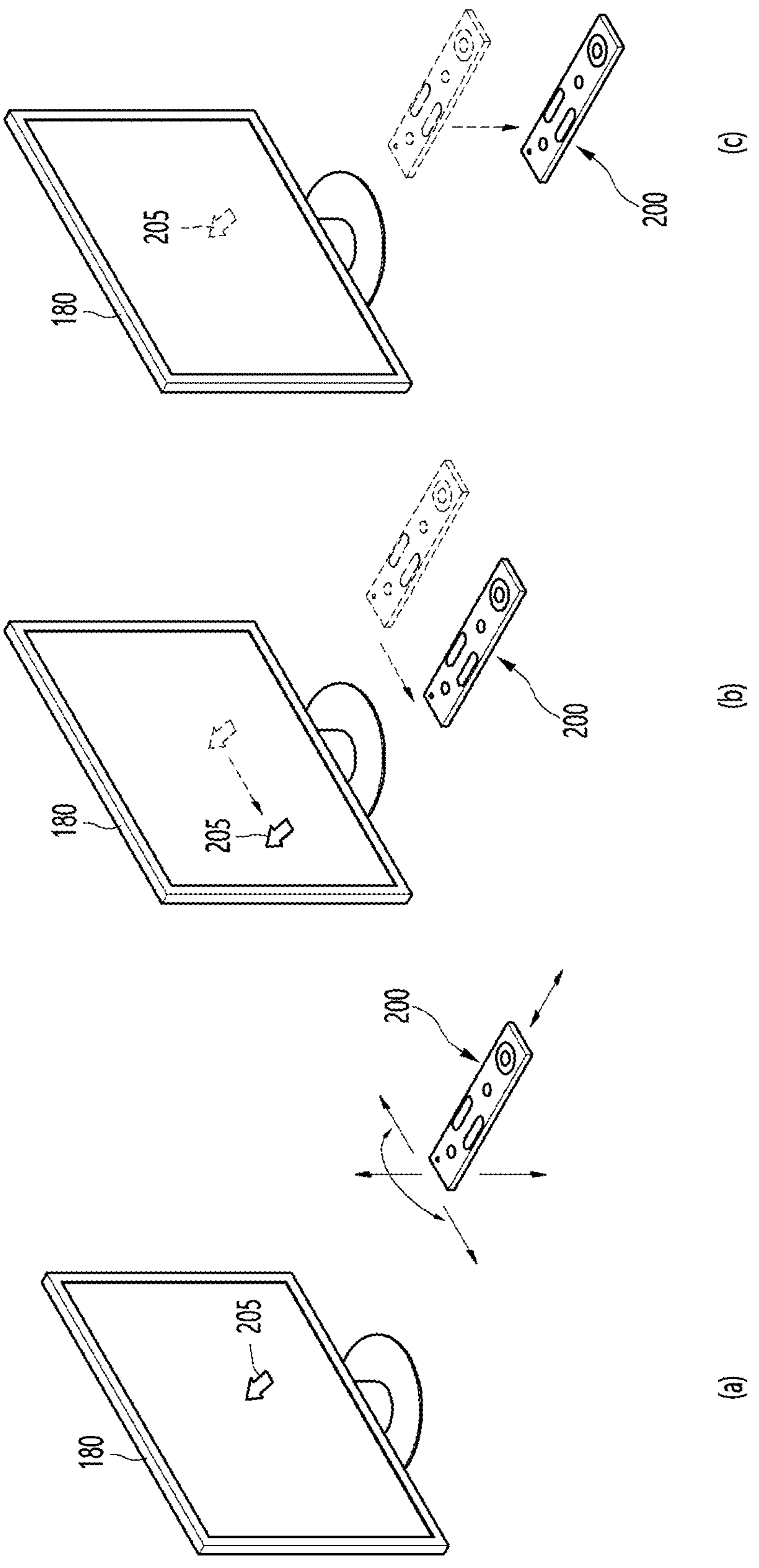
FIG. 4 illustrates an example of utilizing a remote control device according to an embodiment of the present invention.

FIG. 4 illustrates an example of utilizing a remote control device according to an embodiment of the present invention.

FIG. 4(*a*) illustrates a pointer 205 corresponding to the remote control device 200 being displayed on the display 180.

The user can move the remote control device 200 up and down, left and right, or rotate it. The pointer 205 displayed on the display 180 of the display device 100 corresponds to the movement of the remote control device 200. As shown in the drawing, the pointer 205 of this remote control device 200 moves and is displayed according to the movement in 3D space, so it can be called a space remote control.

FIG. 4(*b*) exemplifies that when a user moves the remote control device 200 to the left, the pointer 205 displayed on the display 180 of the display device 100 also moves to the left in response.

Information about the movement of the remote control device 200 detected through the sensor of the remote control device 200 is transmitted to the display device 100. The display device 100 can calculate the coordinates of the pointer 205 from the information about the movement of the remote control device 200. The display device 100 can display the pointer 205 in response to the calculated coordinates.

FIG. 4(*c*) exemplifies a case where a user moves the remote control device 200 away from the display 180 while pressing a specific button in the remote control device 200. By this, the selection area in the display 180 corresponding to the pointer 205 can be zoomed in and displayed in an enlarged manner.

Conversely, when the user moves the remote control device 200 closer to the display 180, the selection area in the display 180 corresponding to the pointer 205 can be zoomed out and displayed in a reduced manner.

Meanwhile, when the remote control device 200 moves away from the display 180, the selection area can be zoomed out, and when the remote control device 200 moves closer to the display 180, the selection area can be zoomed in.

In addition, when a specific button in the remote control device 200 is pressed, the recognition of up, down, left, and right movements can be excluded. That is, when the remote control device 200 moves away from or closer to the display 180, the up, down, left, and right movements can be recognized only, and only the forward and backward movements can be recognized. When a specific button in the remote control device 200 is not pressed, only the pointer 205 moves according to the up, down, left, and right movements of the remote control device 200.

Meanwhile, the moving speed or moving direction of the pointer 205 may correspond to the moving speed or moving direction of the remote control device 200.

Meanwhile, the pointer in this specification refers to an object displayed on the display 180 in response to the operation of the remote control device 200. Therefore, objects of various shapes other than the arrow shape illustrated in the drawing as the pointer 205 are possible. For example, it may be a concept including a point, a cursor, a prompt, a thick outline, etc. In addition, the pointer 205 may be displayed corresponding to one point of the horizontal and vertical axes on the display 180, and may also be displayed corresponding to multiple points such as a line or a surface.

Hereinafter, various embodiments of a method for improving the visibility (e.g., contrast) of an input image by controlling the transmittance of a display panel in a transparent display device 100 according to the present invention in a transparent mode are disclosed.

Figure 5:
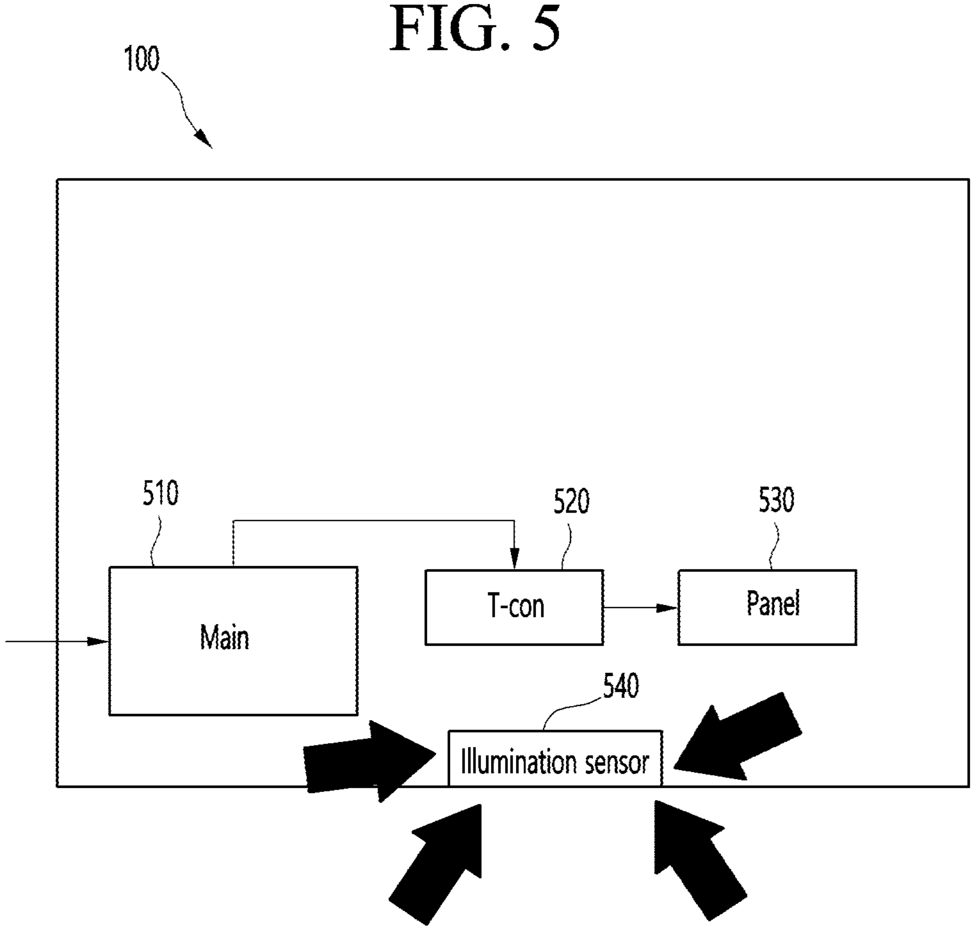
FIG. 5 is a block diagram of a display device for adjusting the transmittance of a panel according to an embodiment of the present invention.
Figure 6:
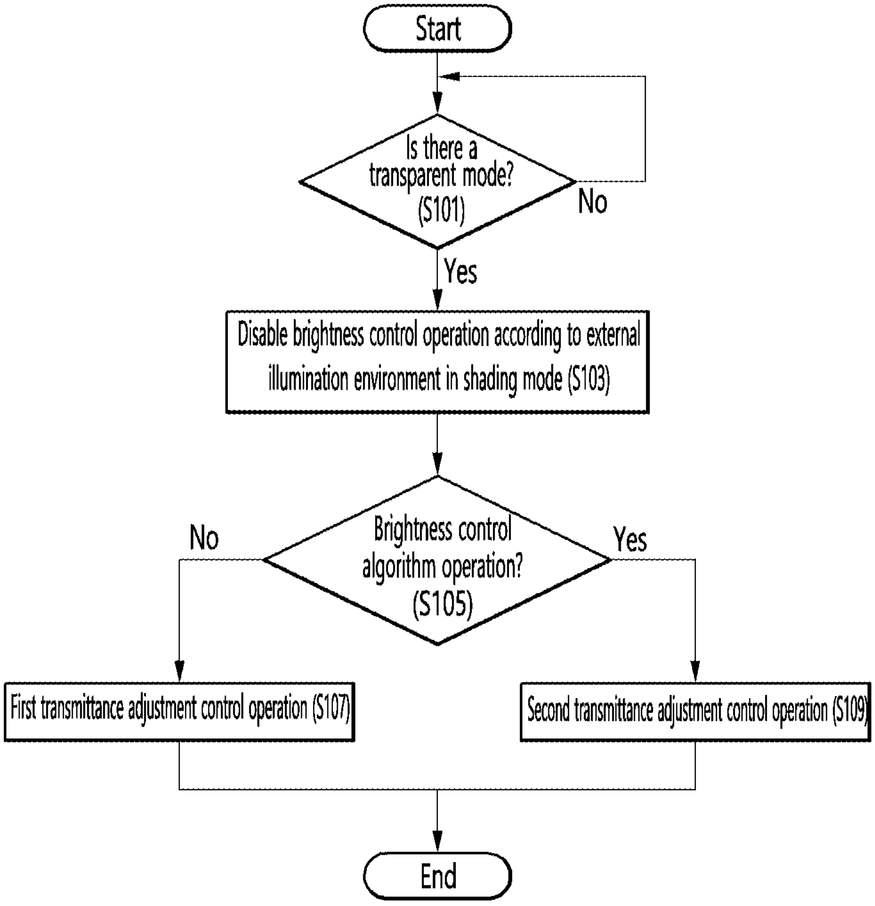
FIG. 6 is a flowchart illustrating a method for controlling the transmittance of a panel in a display device according to an embodiment of the present invention.
Figure 9:
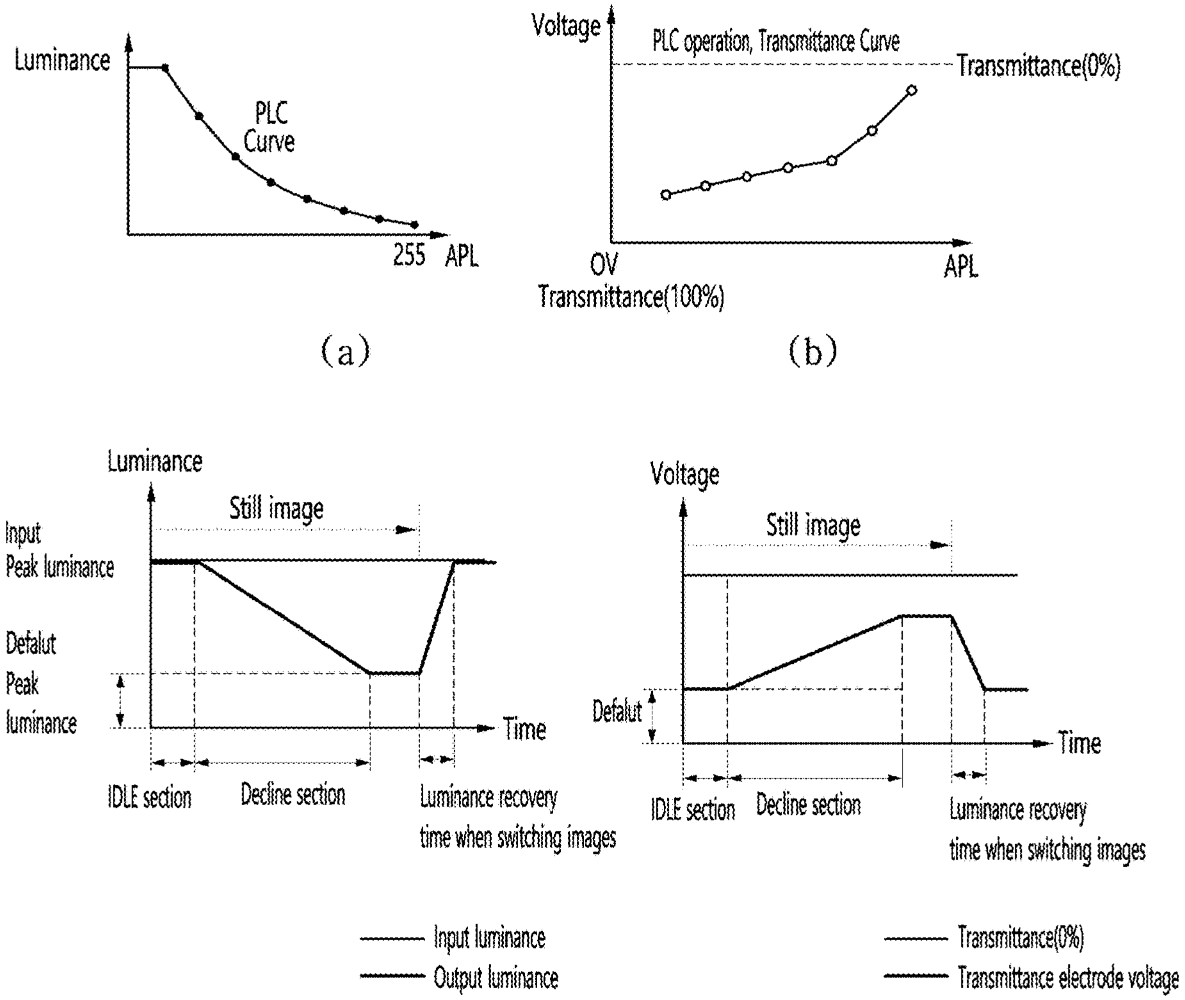
FIG. 9 is a graph illustrating a method for controlling the transmittance of a display device according to an embodiment of the present invention.

FIG. 5 is a block diagram of a display device 100 for controlling the transmittance of a panel according to an embodiment of the present invention, FIG. 6 is a flowchart illustrating a method for controlling the transmittance of a panel in a display device 100 according to an embodiment of the present invention, FIG. 7 is a diagram illustrating a first transmittance control method in a display device 100 according to an embodiment of the present invention, FIG. 8 is a diagram illustrating a second transmittance control method in a display device 100 according to an embodiment of the present invention, and FIG. 9 is a graph illustrating a method for controlling the transmittance in a display device 100 according to an embodiment of the present invention.

Referring to FIG. 5, the display device 100 according to the present invention can improve the visibility of the input image by including a main board 510, a timing controller (T-con) 520, a panel 530, an illuminance sensor 540, a memory (not shown) etc.

For convenience of explanation, only components related to adjusting the transmittance of the panel 530 for an incident light are illustrated in FIG. 5. Meanwhile, processing of the input image can refer to, for example, the components disclosed in FIGS. 1 to 4 described above. Meanwhile, the main board 510 is a component that generates transmittance control data according to the present invention, and may be named or replaced by, for example, a processor, a controller, etc.

The illuminance sensor 540 is installed on the display device 100 to sense externally the incident light, calculate the illuminance of the sensed incident light, and transmit it to the main board 510.

In FIG. 5, only one illuminance sensor is illustrated for convenience of explanation, but the present invention is not limited thereto, and multiple illuminance sensors may be installed in the display device 100.

Meanwhile, the illuminance sensor 540 does not necessarily need to be installed or built into the display device 100, and it is sufficient if it can sense the incident light, calculate the illuminance of the sensed light, and transmit it to the display device 100 (or main board 510). In this case, the illuminance sensor 540 may include a communication means for transmitting the calculated illuminance data to the display device 100.

According to an embodiment, when a plurality of illuminance sensors are used in the present invention, it is preferable that at least one illuminance sensor is installed on the display device 100, and the amount of light (e.g., average value, etc.) calculated by the external illuminance sensor and the illuminance sensor 540 installed on the display device 100 is used, but when the difference in the amount of light calculated by each of the two sensors is greater than a threshold value, the value of the illuminance sensor 540 installed on the display device 100 may be weighted or only the corresponding value may be used, and the value of the external illuminance sensor calculated may be ignored.

The illuminance data of the incident light calculated by the illuminance sensor 540 is used to control the transmittance adjustment of the panel 530, as described below.

The main board 510 can generate transmittance adjustment data of the panel 530 based on the illuminance data of the incident light received from the illuminance sensor 540 and transmit it to the timing controller 520.

The timing controller 520 can control the transmittance of the panel 530 to be adjusted according to the transmittance adjustment data of the panel 530 received from the main board 510.

According to an embodiment, when the illuminance data of the incident light is received from the illuminance sensor 540, the main board 510 can generate transmittance adjustment data and directly control the panel 530 to adjust the transmittance without going through the timing controller 520.

Conversely, the function of the main board 510 described above may be replaced by the timing controller 520 or another configuration or a combination thereof.

Meanwhile, the panel 530 whose transmittance is controlled according to the present invention may have an optical shutter material formed inside, and a signal line and a driving circuit formed above and below the formed optical shutter material to apply an electric field to an Indium Tin Oxide (ITO) electrode.

Therefore, the display device 100 according to the present invention may perform an electrical light-blocking operation for the incident light through the structure of the panel 530.

The transmittance control according to the present invention may be performed through an electrical light-blocking operation, that is, an electrical level setting for the panel transmission module that controls the transmittance through the optical shutter material.

Conventional display devices operate in an on/off mode like a switch, for example, in a full transparency mode to utilize the transparency characteristic, and in a full light-blocking mode to focus on viewing images. However, in the transparent display device according to the present invention, the transmittance of the panel 530 can be applied in stages or by determining an appropriate transmittance by considering the amount of illuminance of the incident light. Through this, improved visibility can be expected compared to the full transparency mode or the full light-blocking mode of the conventional transparent display device.

Referring to FIG. 6, a method for controlling the transmittance of the panel 530 in the transparent display device 100 according to the present invention will be described.

The transparent display device 100 can determine whether it is in a transparent mode (S101).

If the transparent display device 100 is in the transparent mode (or switched to the transparent mode) as a result of the determination in step S101, the brightness control operation or setting according to the external illumination environment in the previous mode, i.e., the light-blocking mode, can be controlled to be deactivated (S103).

This is because the brightness control operation or setting according to the external illumination environment in the light-blocking mode can affect the brightness control operation or setting of the transparent mode that is switched or executed.

However, depending on the embodiment, the step S103 is not essential and may be skipped and not performed.

If the transparent display device 100 is in the transparent mode, the transparent display device 100 can determine whether the brightness control algorithm operates again (S105).

The transparent display device 100 according to the present invention may have a different method for controlling the transmittance depending on step S105, i.e., whether the brightness control algorithm operates.

In the above, the brightness control algorithm refers to an algorithm used for brightness control, such as TPC and PLC, applied to improve element deterioration and power consumption of the display device 100. The TPC is an abbreviation for Temporal Peak Luminance Control, and is a brightness control algorithm for detecting a still image and preventing element deterioration. At this time, the display device 100 periodically checks the difference in average picture level (APL), and if it is a still image, it reduces it to normal brightness, and if the image changes during or after the reduction to normal brightness, it can return it to peak brightness. That is, if the difference in average picture level (APL) of the display device 100 is constant, such as a still image, the brightness of the entire screen may be lowered during TPC operation, which may reduce visibility under the same transmittance condition of the transparent display device 100. Therefore, transmittance adjustment control is required, as described below. Meanwhile, PLC is an abbreviation for Peak Luminance Control, and refers to an algorithm for improving power consumption while increasing contrast (CR) by varying the gamma curve according to the average picture level (APL). However, when the average picture level (APL) is high due to the PLC function operation, if the brightness is lowered, the visibility may decrease under the same transmittance condition of the transparent display device 100, so transmittance adjustment control is required as described below.

If the transparent display device 100 determines that the brightness control algorithm is not operating as a result of the determination in step S105, the transparent display device 100 can perform the first transmittance adjustment control operation (S107).

On the other hand, if the transparent display device 100 determines that the brightness control algorithm is operating as a result of the determination in step S105, the transparent display device 100 can perform the second transmittance adjustment control operation (S109).

As described above, depending on whether the brightness control algorithm operates in the transparent display device 100, a completely different look-up table (LUT), algorithm, etc. may be configured and used for the first or second transmittance control as shown in FIG. 7 or FIG. 8. In this disclosure, the look-up table, algorithm, etc. may be stored in memory.

As described above, the transparent display device 100 according to one embodiment of the present invention may perform the first or second transmittance control operation depending on whether the brightness control algorithm operates.

The transparent display device 100 according to another embodiment of the present invention may perform the first or second transmittance control operation by selection regardless of whether the brightness control algorithm operates.

The transparent display device 100 according to another embodiment of the present invention may perform the first and second transmittance control operations sequentially or in combination regardless of whether the brightness control algorithm operates.

Meanwhile, the higher the transmittance, the lower the voltage applied to the transmitting portion of the panel 530.

The first transmittance control operation will be described with reference to FIG. 7.

FIG. 7(*a*) is a first lookup table (LUT1) configured in relation to the first transmittance control operation according to an embodiment of the present invention, and FIG. 7(*b*) is an example of a transmittance control algorithm based on the first lookup table (LUT1) of FIG. 7(*a*).

First, referring to FIG. 7(*a*), the first lookup table (LUT1) is defined in 10 steps for convenience of explanation, and is configured by mapping external brightness, image average picture level (APL), and transmittance information.

In the above, the external brightness value may represent the illuminance of the incident light.

The image average picture level (APL) value may represent the average picture level (APL) for the input image.

The transmittance represents an electrical level setting value for controlling the transmittance of the optical shutter material constituting the transmitting portion of the panel 530, i.e., the electric light-shielding plate or the electric light-shielding film, and may be adjusted in stages from step 1 to step 10, for a total of 10 stages. In FIG. 7(*a*), for convenience, the lower the stage, i.e., the closer to step 1, the lower the transmittance (darkness), and conversely, the higher the stage, i.e., the closer to step 10, the higher the transmittance (brightness). However, this is only one example, and the present invention is not limited thereto, and may be defined in the opposite way to the above.

In addition, although the transmittance adjustment is performed in 10 steps in FIG. 7(*a*) and the present disclosure, the present invention is not limited thereto, and the transmittance adjustment steps can be arbitrarily set or changed, such as 5 steps or 20 steps.

According to one embodiment, the first lookup table (LUT1) illustrated in FIG. 7(*a*) can be defined by dividing the external brightness value into 10 steps and then assigning an image average picture level (APL) value corresponding to the external brightness values of the defined 10 steps. In addition, the transmittance can indicate an appropriate transmittance adjustment degree corresponding to each step of the defined 10 steps.

For example, referring to FIG. 7(*a*), if the illuminance of the incident light sensed and calculated by the illuminance sensor 540, i.e., the external brightness value, corresponds to range 5, then the image APL at that time is appropriately 101 to 125, and the transmittance at that time is appropriately step 5, so the main board 510 can control the transmittance of the panel 530 transmission part to be adjusted to step 5 through the timing controller 520. In this way, variables corresponding to each step can be mapped to each other to form a lookup table (LUT1) and stored in memory so that the determined electrical shading level is applied to the panel 530 transmission part, and the transmittance of the incident light can be appropriately adjusted.

According to another embodiment, the first lookup table (LUT1) illustrated in FIG. 7(*a*) may be configured by dividing the average picture level (APL) value of the image into 10 steps instead of the external brightness value, and then mapping the corresponding range of the external brightness value and the degree of transmittance (step) accordingly. Accordingly, when the average picture level (APL) value of the input image is, for example, 80, the main board 510 can determine that the external brightness value at this time is appropriate in the range 4, and the transmittance is determined to be the most appropriate control degree for visibility at step 4 (electrical light blocking level), and accordingly, the transmittance of the panel 530 may be controlled to step 4 via the timing controller 520.

According to another embodiment, the first lookup table (LUT1) illustrated in FIG. 7(*a*) may be configured by pre-dividing the transmittance into 10 steps, not the external brightness value or the image average picture level (APL) value, and mapping the external brightness value and the image average picture level (APL) value suitable for each step, that is, the optimal visibility, to each step. Accordingly, when the main board 510 adjusts the transmittance by setting it to step 5 in advance, if the external brightness value at that time corresponds to range 5 and the image average picture level (APL) is 101 to 125, the corresponding transmittance can be maintained. However, if the transmittance step 5 is set and applied, but the range of the external brightness value or the image average picture level (APL) value is not within the range defined by mapping to the first lookup table (LUT1), it is preferable not to maintain the applied step 5 and change it.

However, the first lookup table (LUT1) illustrated in the above-described FIG. 7(*a*) can be regarded as a reference, and if the calculated external brightness value corresponds to range 5, but the image APL is not 101 to 125, it is preferable that the electrical light blocking level of the panel transmission module is determined by a step other than step 5 and the transmittance is adjusted.

Next, based on the first lookup table (LUT1) illustrated in the above-described FIG. 7(*a*), an algorithm for adjusting the transmittance of the panel 530 in the display device 100 is described.

FIG. 7(*b*) illustrates the process of adjusting the transmittance of the panel 530 transmission part based on the first lookup table (LUT1) illustrated in FIG. 7(*a*) in the display device 100 according to the present invention, as follows.

If the transparent display device 100 is in the transparent mode, the transmittance of step 10 (maximum step) can be first applied to the panel 530 transparent section.

Next, in order to determine whether to control the applied transmittance, such as maintaining or changing it, it can be determined whether the average picture level (APL) is higher than the external brightness value.

If the average picture level (APL) value of the input image is lower than the calculated external brightness value as a result of the determination, the transmittance can be changed and set to step 1 (minimum step). This is to adjust the transmittance of the panel 530 of the incident light to improve visibility, i.e., contrast, because the external brightness is brighter than the image.

On the other hand, if the average picture level (APL) value of the input image is higher than the calculated external brightness value as a result of the determination, additional operations can be performed as follows to determine a more appropriate transmittance application step.

If the average picture level (APL) value of the input image is greater than or equal to the external brightness value, it can be determined whether the calculated external brightness value is less than or equal to the range 2 of the first lookup table (LUT1) illustrated in FIG. 7(*a*). At this time, the range 2 is only an example that symbolically represents a case where the outside is dark, and the present invention is not limited thereto.

If the external brightness value exceeds the range 2 defined on the first lookup table (LUT1), it is then determined whether the difference between the average picture level (APL) value and the external brightness value ('APL−external brightness') is greater than or equal to the first threshold value. At this time, the first threshold value is exemplified as '4' in FIG. 7(*b*), but the present invention is not limited thereto.

As a result of the determination, if the difference between the average picture level (APL) and the external brightness value is greater than or equal to the first threshold value, the transmittance can be controlled to be maintained. On the other hand, if the difference between the average picture level (APL) value and the external brightness value is less than the first threshold value as a result of the above judgment, the transmittance can be controlled to change to step 1. That is, if the external brightness value is less than or equal to range 2 and the average picture level (APL) value and the external brightness value are less than '4', it is preferable to set the transmittance to the lowest (step 1).

Meanwhile, if the external brightness value exceeds range 2 on the first lookup table (LUT1), it is then determined whether the difference between the average picture level (APL) value and the external brightness value ('APL−external brightness') is greater than or equal to the second threshold value. At this time, the second threshold value is exemplified as '5' in FIG. 7(*b*), but the present invention is not limited thereto.

If the difference between the average picture level (APL) and the external brightness value is greater than or equal to the second threshold value as a result of the above judgment, the transmittance can be controlled to be maintained. On the other hand, if the difference between the average picture level (APL) value and the external brightness value is less than the second threshold value as a result of the above judgment, the transmittance can be controlled to be changed to step 2. That is, if the external brightness value exceeds range 2 and the average picture level (APL) and the external brightness value are less than '5', it is preferable to set the transmittance to step 2.

By repeating the above-described process multiple times, the optimal transmittance step can be determined or found, and the electrical level corresponding to the step step can be set to the transmission part of the panel 530 so that the visibility of the input image can be improved.

The second transmittance control operation will be described with reference to FIG. 8.

FIG. 8(*a*) is an example of a second lookup table (LUT2) configured according to an embodiment of the present invention, and FIG. 8(*b*) is an example of a transmittance control algorithm based on the second lookup table (LUT2) of FIG. 8(*a*).

Referring to FIG. 8(*a*), the second lookup table (LUT2) is also defined in 10 steps and is configured by mapping information on external brightness, image average picture level (APL), panel luminance, and transmittance.

At this time, the contents of the external brightness value, image average picture level (APL) value, and transmittance refer to the description of the first lookup table (LUT1) illustrated in FIG. 7(*a*) described above, and redundant description is omitted here.

However, the steps and the electrical level setting values corresponding to each step in the second lookup table (LUT2) are not necessarily the same as the steps and the electrical level setting values corresponding to the corresponding steps in the first lookup table (LUT1) described above. Like the first lookup table (LUT1), the second lookup table (LUT2) can also be arbitrarily defined as 5 steps or 15 steps, not the 10 steps illustrated. In addition, in the second lookup table (LUT2), for example, the external brightness value, image APL value, and transmittance degree corresponding to each of the 5 steps may or may not be the same as the corresponding values of the first lookup table (LUT1) disclosed in the aforementioned FIG. 7(*a*).

Meanwhile, the panel brightness on the second lookup table (LUT2) illustrated in FIG. 8(*a*) may be, for example, the brightness value of the panel applied according to the operation of the brightness control algorithm as described above.

According to one embodiment, the second lookup table (LUT2) illustrated in FIG. 8(*a*) may be defined by dividing the external brightness into 10 steps and then assigning the image APL value and panel brightness value corresponding to the external brightness of the defined 10 steps. In addition, the transmittance may indicate an appropriate transmittance adjustment degree corresponding to each step of the defined 10 steps.

For example, referring to FIG. 8(*a*), if the illuminance of the incident light sensed by the illuminance sensor 540, i.e., the external brightness value, corresponds to range 7, then the image APL at that time is 151 to 175, the panel brightness is 61 to 70, and the transmittance at that time is appropriate at step 7, so the main board 510 can control the transmittance of the panel 530 to be adjusted to step 7 through the timing controller 520. In this way, variables corresponding to each step are mapped to each other to form a second lookup table (LUT2) and stored in memory so that the determined electrical shading level is applied to the transparent portion of the panel 530 so that the transmittance of the incident light is appropriately adjusted.

According to another embodiment, the second lookup table (LUT2) illustrated in FIG. 8(*a*) may be configured by defining the average picture level (APL) of the image by dividing it into 10 steps instead of the aforementioned external brightness value, and then mapping the corresponding range of the external brightness value, the panel brightness value, and the transmittance level (step). Accordingly, when the average picture level (APL) value of the input image is, for example, 80, the main board 510 can determine that the external brightness value at this time is in the range 4, the panel brightness value is 31 to 40, and the transmittance is in the step 4 (electrical light blocking level) as the most appropriate control level for visibility, and accordingly controls the transmittance of the panel 530 to step 4 via the timing controller 520.

According to another embodiment, the second lookup table (LUT2) illustrated in FIG. 8(*a*) may be configured by defining the panel luminance value by dividing it into 10 steps instead of the aforementioned external brightness value or image average picture level (APL) value, and then mapping the corresponding external brightness value range, image average picture level (APL) value, and transmittance degree (step). Accordingly, when the luminance value of the panel of the input image is, for example, 15, the main board 510 determines that the external brightness value at this time is range 2, the image average picture level (APL) value is 26 to 50, and the transmittance is step 2 (electrical light blocking level) as the most appropriate control degree for visibility, and accordingly controls the transmittance of the panel 530 transmission part to step 2 via the timing controller 520.

According to another embodiment, the second lookup table (LUT2) illustrated in FIG. 8(*a*) may be configured by defining the transmittance in advance by dividing it into 10 steps instead of the aforementioned external brightness value, image average picture level (APL) value, and panel luminance value, and mapping the external brightness value, image average picture level (APL) value, and panel luminance value suitable for each step, that is, having optimal visibility. Accordingly, when the main board 510 adjusts the transmittance by setting it to step 6 in advance, the external brightness at that time is in the range 6, the image average picture level (APL) value is 126 to 150, and the panel luminance value is 51 to 60, the corresponding transmittance can be maintained. However, if the step 6 is set and applied with the above transmittance, but the range of the external brightness, the average picture level (APL) value of the image, or the luminance value of the panel is determined to be outside the range defined by the mapping in the second lookup table (LUT2), it is preferable to change the applied step 6 without maintaining it.

For example, the second lookup table (LUT2) illustrated in the above FIG. 8(*a*) can be regarded as a reference, and if the image APL is not 151 to 175 even though the calculated external brightness value corresponds to the range 7, the electrical light blocking level of the panel 530 can be determined by a step other than step 7 so that the transmittance can be adjusted.

When referring to the first lookup table (LUT1) and the second lookup table (LUT2), as described above, each value is mapped to each other, but if any of the values on the lookup table at a specific stage is different from the pre-mapped value, another stage should be considered, and at this time, the values on the lookup table may be considered when determining the stage by being given, for example, a priority or weight.

Next, based on the second lookup table (LUT2) illustrated in the above-described FIG. 8(*a*), an algorithm for controlling the transmittance of the panel 530 in the display device 100 is described.

FIG. 8(*b*) illustrates a process for controlling the transmittance of the panel 530 transmission part based on the second lookup table (LUT2) illustrated in FIG. 8(*a*) in the display device 100 according to the present invention, as follows.

If the transparent display device 100 is in the transparent mode, the panel 530 may first be set and applied with the transmittance of step 10 (maximum step).

In order to determine whether the transmittance is controlled, it may be determined whether the average picture level (APL) value is higher than the external brightness value. If the average picture level (APL) value of the input image is lower than the calculated external brightness value as a result of the determination, the transmittance may be changed and set to step 1 (minimum step). This is to control and adjust the transmittance of the incident light to improve the contrast, i.e., visibility, because the external brightness is brighter than the image.

On the other hand, if the average picture level (APL) value of the input image is higher than the calculated external brightness value as a result of the determination, the following additional operation may be performed to determine a more appropriate transmittance application step.

Next, if the average picture level (APL) value of the input image is greater than or equal to the external brightness value, it can be determined whether the calculated external brightness value is less than or equal to the range 2 of the second lookup table (LUT2) illustrated in FIG. 8(*a*) and the brightness control algorithm is in operation. At this time, the range 2 is merely an example that symbolically represents a case where the outside is dark, and the present invention is not limited thereto.

If the external brightness value is less than the range 2 defined on the second lookup table (LUT2), the brightness reduction step 2 according to the brightness control algorithm can be lowered.

Next, it is determined whether the difference between the average picture level (APL) value and the external brightness value ('APL−external brightness') is greater than or equal to the third threshold value. At this time, the third threshold value is exemplified as '4' in FIG. 8(*b*), but the present invention is not limited thereto.

If the difference between the average picture level (APL) value and the external brightness value is greater than or equal to the third threshold value as a result of the above judgment, the current transmittance can be lowered by two steps because the image is brighter than the external brightness. This may be, for example, for brightness compensation according to the brightness reduction. On the other hand, if the difference between the average picture level (APL) value and the external brightness value is less than or equal to the third threshold value as a result of the above judgment, the transmittance can be controlled to be changed to step 1 (the lowest step). That is, if the external brightness value is less than or equal to range 2 and the brightness control algorithm is in operation, and at the same time, the average picture level (APL) value and the external brightness value are less than '4', it is desirable to set the transmittance to the lowest step (step 1).

Meanwhile, if the external brightness value is greater than or equal to range 3 on the second lookup table (LUT2) and the brightness control algorithm is in operation, it can be determined whether the difference between the average picture level (APL) value and the external brightness value ('APL−external brightness') is greater than or equal to the fourth threshold value. At this time, the fourth threshold value is exemplified as '5' in FIG. 8(*b*), but the present invention is not limited thereto.

If the difference between the average picture level (APL) value and the external brightness value is greater than or equal to the fourth threshold value as a result of the above judgment, the current transmittance can be lowered by two steps. At this time, the external brightness value range can also be lowered by two steps.

On the other hand, if the difference between the average picture level (APL) value and the external brightness value is less than the fourth threshold value as a result of the above judgment, the transmittance can be controlled to be changed to the lowest step 1. That is, if the external brightness value is greater than or equal to range 3 and the brightness control algorithm is in operation while the average picture level (APL) value and the external brightness value are less than 5, it is desirable to set the transmittance to the lowest step (step 1).

By repeating the above-described process multiple times, the optimal transmittance step step can be determined or found, and the electrical level corresponding to the step step can be set to the transparent part of the panel 530, so that the visibility of the input image can be improved.

The first lookup table (LUT1) illustrated and described in FIG. 7 and the second lookup table (LUT2) illustrated and described in FIG. 8 are only examples, and the present invention is not limited thereto. In addition, the range or number on each lookup table is also only an example, and is not limited thereto.

FIG. 9 illustrates a graph related to a method for controlling transmittance in a transparent display device 100 according to an embodiment of the present invention.

FIG. 9 may be, for example, a graph explaining the principle referred to in the configuration of the first lookup table (LUT1) of FIG. 7 and the configuration of the second lookup table (LUT2) of FIG. 8.

FIG. 9(*a*) illustrates a PLC curve between the average picture level (APL) of the input image and the luminance. FIG. 9(*b*) illustrates the average picture level (APL) of the input image and the voltage, that is, the transmittance, and in particular, illustrates a transmittance curve during PLC operation according to the PLC curve illustrated in FIG. 9(*a*). FIG. 9(*c*) is a graph illustrating changes in luminance over time, and time is divided into an idle section, a luminance attenuation section, and a luminance recovery section when the image is switched, and illustrates changes in luminance in each section. FIG. 9(*d*) is a graph illustrating the control of transmittance during the same time section related to the graph of FIG. 9(*c*). In FIG. 9(*c*), it can be seen that the output luminance gradually decreases in the attenuation section, and in FIG. 9(*d*), the electrical level (voltage) gradually increases in the corresponding section, that is, the transmittance gradually decreases. And when the image is switched, referring to FIG. 9(*c*), the output brightness is restored to the same level as the input brightness, and referring to FIG. 9(*d*), it can be seen that the voltage value in the corresponding section falls back to the default value of the transmission mode.

Meanwhile, in the above, the maximum step (e.g., step 10) may represent the full transmission mode, and the minimum step (e.g., step 1) may or may not represent the full shading mode. For example, the maximum step and the minimum step may represent the maximum and minimum values in the range between the full transmission mode and the full shading mode. The range may be arbitrarily determined in the display device 100 or may be adaptively determined or changed according to the previous transmittance control mode. For example, if at least one value of various variables on the above-described lookup table exceeds or is less than a predetermined value, the range may be adaptively changed accordingly. Alternatively, based on learning or previous history information, if more detailed transmittance control is required or the opposite is the case, the step can be defined more precisely or inversely to determine and apply transmittance control. This can be based on a request or setting. In other words, the contents of the lookup table, etc., for transmittance control can be adaptively and arbitrarily modified, changed, etc. according to various internal or external events or settings of the display device 100.

As described above, according to at least one of the various embodiments of the present disclosure, the visibility of an input image can be improved despite an external incident light, and the visibility of the input image can be further improved by setting the optimal transmittance of the panel corresponding to the input image in consideration of various factors such as the external incident light, a brightness setting value of the panel, an average picture level of the input image, or a combination thereof.

According to one embodiment of the present invention, the above-described method can be implemented as a code that can be read by a processor on a medium in which a program is recorded. Examples of media that can be read by the processor include ROM, RAM, CD-ROM, magnetic tape, floppy disk, optical data storage device, etc.

The display device described above is not limited to the configuration and method of the embodiments described above, and the embodiments may be configured by selectively combining all or part of each embodiment so that various modifications can be made.

INDUSTRIAL APPLICABILITY

According to the display device according to the present disclosure, the visibility of an input image can be significantly improved by controlling the electrical light-blocking level of a panel transmission module, and therefore, it has industrial applicability.

What is claimed is:

1. A transparent display device, comprising:

a memory;

at least one sensor; and a controller configured to adjust a transmittance of a panel transmission module of an incident light based on an illuminance of the incident light calculated through the at least one sensor and an average picture level (APL) value of an input image at a same time.

2. The transparent display device of claim 1, wherein the controller is configured to set a level of electric shielding corresponding to each step so that the transmittance of the panel transmission module is adjusted in steps.

3. The transparent display device of claim 2, wherein the controller is configured to set the level of electric shielding by adjusting a voltage level applied to an optical shutter material of the panel transmission module.

4. The transparent display device of claim 1, wherein the controller is configured to determine whether to change to a transmission mode in which the transmittance of the panel transmission module for the incident light is adjusted for the input image.

5. The transparent display device of claim 4, wherein the controller is configured to control so that, when the determination result is changed to a transparent mode, a control operation set in a shading mode before the change is deactivated.

6. The transparent display device of claim 4, wherein the controller is configured to define a transmittance adjustment range for a transparent mode between a complete shading mode and a complete transmission mode of the panel transmission module.

7. The transparent display device of claim 6, wherein the controller is configured to divide the transmittance adjustment range for the transparent mode into a plurality of stages, generate a first lookup table by mapping the illuminance of the incident light, the average picture level (APL) value of the input image, and the electrical shading level corresponding to each stage, and control so that the generated first lookup table is stored in the memory.

8. The transparent display device of claim 7, wherein the controller is configured to set the stage initially set for the panel transmission module in the transmission mode to a maximum step based on the first lookup table, and if the average picture level (APL) value of the input image is less than the illuminance of the incident light, change the setting to a minimum step, and if the average picture level (APL) value of the input image is greater than or equal to the illuminance of the incident light, maintain the maximum step setting, and compare the range of the illuminance of the incident light and the difference between the average picture level (APL) value of the input image and the illuminance of the incident light with a threshold value to identify the step corresponding to the appropriate transmittance.

9. The transparent display device of claim 6, wherein the controller is configured to determine whether a brightness control algorithm is operating.

10. The transparent display device of claim 9, wherein the controller is configured to, when the brightness control algorithm is operating, adjust the transmittance of the panel transmission module for the incident light based on the luminance value of the panel.

11. The transparent display device of claim 10, wherein the controller is configured to divide the transmittance adjustment range for the transmission mode into a plurality of steps, and generate a second lookup table by mapping the illuminance of the incident light, the average picture level (APL) value of the input image, the luminance value of the panel, and the electrical shielding level corresponding to each step, and control the second lookup table to be stored in the memory.

12. The transparent display device of claim 11, wherein the controller is configured to set an initial setting step of the panel transmission module in the transmission mode to the maximum step.

13. The transparent display device of claim 12, wherein the controller is configured to compare the average picture level (APL) value of the input image with the illuminance of the incident light, and when the average picture level (APL) value of the input image is less than the illuminance of the incident light, change the setting to the minimum step.

14. The transparent display device of claim 12, wherein the controller is configured to compare the average picture level (APL) value of the input image with the illuminance of incident light, and when the average picture level (APL) value of the input image is greater than or equal to the illuminance of the incident light, maintain the maximum step setting, and compare the range of the illuminance of the incident light and the difference between the average picture level (APL) value of the input image and the illuminance of the incident light with a threshold value to determine a step corresponding to an appropriate transmittance.

15. The transparent display device of claim 1, wherein the controller is configured to adjust a transmittance of the panel transmission module based on a comparison of an incident light based on an illuminance of the incident light calculated through the at least one sensor and the average picture level (APL) value of the input image.

16. A method for operating a transparent display device, comprising:

determining whether it is a transparent mode;

deactivating a control operation set in a light-blocking mode when it is the transparent mode;

calculating an illuminance of an incident light and an average picture level (APL) value of an input image; and controlling a transmittance of a panel transmission module for the incident light based on, at a same time, at least two or more of the calculated illuminance of the incident light average picture level (APL) value of the input image, and the luminance value of a panel, depending on whether a brightness control algorithm is in operation.

* * * * *